United States Patent
Adams et al.

(10) Patent No.: US 9,716,720 B2
(45) Date of Patent: *Jul. 25, 2017

(54) UNREGISTERED USER ACCOUNT GENERATION FOR CONTENT ITEM SHARING

(71) Applicant: Dropbox, Inc., San Francisco, CA (US)

(72) Inventors: John Adams, San Francisco, CA (US); Aditi Jain, San Francisco, CA (US); Matteus Pan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,478

(22) Filed: May 11, 2016

(65) Prior Publication Data

US 2016/0255092 A1 Sep. 1, 2016

Related U.S. Application Data

(63) Continuation of application No. 14/331,767, filed on Jul. 15, 2014, now Pat. No. 9,344,433.

(51) Int. Cl.
*H04L 29/06* (2006.01)
*G06Q 10/10* (2012.01)
(Continued)

(52) U.S. Cl.
CPC ......... *H04L 63/102* (2013.01); *G06Q 10/101* (2013.01); *H04L 63/083* (2013.01); *H04L 63/0815* (2013.01); *H04L 63/108* (2013.01)

(58) Field of Classification Search
None
See application file for complete search history.

(56) References Cited

U.S. PATENT DOCUMENTS 6,856,989 B1 * 2/2005 Zhou ................. G06F 17/30893
8,346,953 B1 1/2013 Hew et al.
(Continued)

FOREIGN PATENT DOCUMENTS

| WO | 2012/177253 A1 | 12/2012 | |
|---|---|---|---|
| WO | WO 2012177253 A1 * | 12/2012 | ......... G06F 21/6209 |
| WO | WO 2014143904 A1 * | 9/2014 | ............... G06F 3/06 |

OTHER PUBLICATIONS

Kaufman "The Best Free Programs and Online Services for Sending and Sharing Large file"—(http:www.howtogeek.com/133761/the-best-free-programs-and-online-services-for-sending-and-sharing-large-files/), published on Jan. 12, 2013.*
(Continued)

*Primary Examiner* — Shin-Hon Chen
(74) *Attorney, Agent, or Firm* — Polsinelli PC

(57) ABSTRACT

Various embodiments of the present technology involve the sharing of a content item though a synchronized content management system (CMS) without requiring a user to register or provide login credentials. For example, the CMS can receive a request from a first user of a computing device to share a content item with a second user. Instead of requiring the user to register or provide their login credentials, the CMS can generate an unregistered user account using a unique identifier associated with the computing device. Accordingly, in order to share the content item, the CMS can generate a link to retrieve the content item and send the link to the second user. Thus, creation of an unregistered user account can require no login credentials, thereby providing a simple, user friendly interface for initiating interactions with the CMS.

22 Claims, 7 Drawing Sheets

(51) Int. Cl.
  *G06F 7/04* (2006.01)
  *G06F 15/16* (2006.01)
  *G06F 17/30* (2006.01)

(56) References Cited

U.S. PATENT DOCUMENTS

| | | | |
|---|---|---|---|
| 8,762,512 B1 | 6/2014 | Sundaram | |
| 2003/0212571 A1* | 11/2003 | Sazawa | G06F 17/30067 709/213 |
| 2004/0215788 A1* | 10/2004 | Morris | G06Q 10/00 709/227 |
| 2006/0173867 A1 | 8/2006 | Gaucas et al. | |
| 2008/0133726 A1* | 6/2008 | Richardson | H04L 63/105 709/223 |
| 2008/0233919 A1 | 9/2008 | Kenney | |
| 2008/0320397 A1* | 12/2008 | Do | G06F 17/30126 715/751 |
| 2012/0008786 A1 | 1/2012 | Cronk et al. | |
| 2012/0102008 A1* | 4/2012 | Kaariainen | G06Q 30/0201 707/705 |
| 2012/0134818 A1* | 5/2012 | Sato | F03D 80/00 416/95 |
| 2012/0246226 A1* | 9/2012 | Anandam | H04L 67/06 709/203 |
| 2012/0324002 A1 | 12/2012 | Chen | |
| 2012/0331108 A1* | 12/2012 | Ferdowsi | H04L 67/06 709/219 |
| 2013/0046833 A1* | 2/2013 | Riepling | H04L 67/06 709/206 |
| 2013/0166918 A1 | 6/2013 | Shahbazi et al. | |
| 2013/0173112 A1 | 7/2013 | Takahashi et al. | |
| 2013/0219176 A1 | 8/2013 | Akella et al. | |
| 2013/0227711 A1 | 8/2013 | MacPherson et al. | |
| 2013/0232189 A1 | 9/2013 | Lewis et al. | |
| 2013/0295872 A1 | 11/2013 | Guday et al. | |
| 2013/0333022 A1* | 12/2013 | Torkkel | G06F 21/31 726/17 |
| 2014/0189355 A1* | 7/2014 | Hunter | H04L 63/06 713/171 |
| 2014/0195516 A1* | 7/2014 | Balakrishnan | G06F 17/30126 707/722 |
| 2014/0282901 A1 | 9/2014 | Dwan et al. | |
| 2014/0282938 A1 | 9/2014 | Moisa | |
| 2014/0282971 A1 | 9/2014 | Gustavson et al. | |
| 2014/0310779 A1* | 10/2014 | Lof | H04L 63/0421 726/4 |
| 2015/0113279 A1* | 4/2015 | Andersen | H04L 63/0457 713/171 |
| 2015/0134818 A1 | 5/2015 | Kearney et al. | |
| 2015/0242643 A1* | 8/2015 | Hankins, Jr. | H04L 63/04 726/26 |

OTHER PUBLICATIONS

Josh Lowensohn "How to Save and Share Ridiculously Large Files", http://www.cnet.com/au/how-to/how-to-save-and-share-ridiculously-large-files/ (published Mar. 9, 2010).*
Orli Yakuel "16 Apps That Make Sharing Large Files a Snap", http://techcrunch.com/2009/08/08/16-apps-that-make-sharing-large-files-a-snap/ (published Aug. 8, 2009).*
Gajasinghe, Kasun , "Introduction to Security Assertion Markup Language 2.0", (Retrieved on Mar. 7, 2016 at http://wso2.com/library/articles/2014/02/introduction-to-security-assertion-markup-language-2.0/?gclid=CJ2t7Lzsr8sCFQEJaQodqxlKYw), Feb. 3, 2014, 1-8.
Amy K. Karlson et al., "Can I Borrow Your Phone? Understanding Concerns When Sharing Mobile Phones," CHI 2009, Apr. 4-9, 2009, Boston, MA, USA, ACM, 2009.
Lori Kaufman, "The Best Free Programs and Online Services for Sending and Sharing Large Files" http://www.howtogeek.com/133761/the-best-free-programs-and-online-services-for-sending-and-sharing-large-files/, published on Jan. 12, 2013 (Entire article).
Yaara Lancet, "Better Than Dropbox: The 6 Quickest Ways to Share Any File With Anyone", http://www.makeuseof.com/tag/dropbox-quickest-ways-share-file-si/ (published Jul. 17, 2012).
Josh Lowensohn, "How to Save and Share Ridiculously Large Files", http://www.cnet.com/au/how-to/how-to-save-and-shareridiculously-large-files/ (published Mar. 9, 2010).
PCT Search Report and Written Opinion mailed on Sep. 16, 2015 for Application No. PCT/US2015/040545, filed Jul. 15, 2015, titled, "Unregistered User Account Generation for Content Item Sharing", 11 pages.
Orli Yakuel, "16 Apps That Make Sharing Large Files a Snap", http://techcrunch.com/2009/08/08/16-apps-that-make-sharing-large-files-a-snap/ (published Aug. 8, 2009).

* cited by examiner

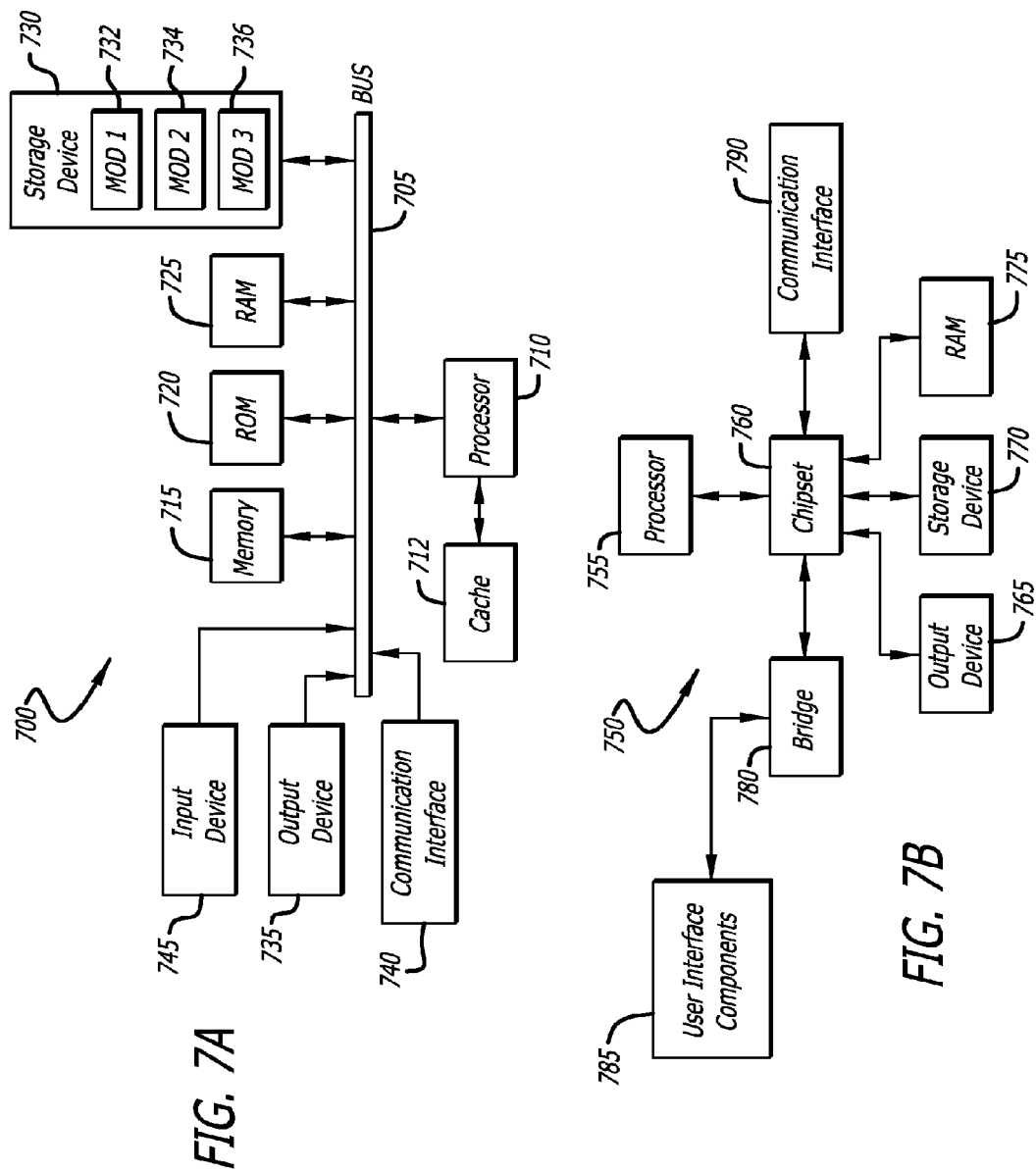

UNREGISTERED USER ACCOUNT GENERATION FOR CONTENT ITEM SHARING

CROSS REFERENCE TO RELATED APPLICATIONS

This application is a continuation of U.S. patent application Ser. No. 14/331,767, filed on Jul. 15, 2014, entitled, "UNREGISTERED USER ACCOUNT GENERATION FOR CONTENT HEM SHARING"; which is hereby expressly incorporated herein by reference in its entirety.

TECHNICAL FIELD

The present technology pertains to sharing media content, and more specifically pertains to enabling a user that is not registered with a content management system to share content with other users via the content management system.

BACKGROUND

Content stored in an online storage account with a synchronized content management system can be accessed on computing devices in a variety of ways, such as through a stand-alone application, one or more application plug-ins, a web browser, etc. Users can, thus, upload content items such as pictures, songs, documents, etc. from a computing device to their online storage account and later access the content items from different computing devices. A synchronized content management system can also facilitate the sharing of content between users. Users can, therefore, create a link to a respective content item that can be shared with another user and which the other user can later use to access the content item.

In order to adequately reference, retrieve, and securely store the content items, users are often required to create a user account and maintain login credentials. Requiring users to create a user account and maintain login credentials, however, may sometimes act as a barrier preventing some users from taking advantage of services offered by a synchronized content management system because such users do not want to take the time to register. At other times, a user may find themselves inadvertently logged out of their user account or they may be using a new or foreign computing device and not want to take the time required to login in order to take advantages of the full services provided by the synchronized content management system. Accordingly, it could be advantageous to develop a means for enabling users to share content items without requiring a user to register or provide login credential.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for sharing a content item though a synchronized content management system (CMS) without requiring a user to register or provide login credentials. For example, the CMS can receive a request from a first user of a computing device to share a content item with a second user. The CMS, upon receiving the request, can determine that the requesting device is either not associated with or not logged into a user account. Instead of requiring the user to register or provide their login credentials, the CMS can generate an unregistered user or ghost account using a unique identifier associated with the computing device. For example, the unique identifier could be a device ID, a phone number if the device is a smartphone, an email address, or any other available identifier which can be used to uniquely and repeatable identify the computing device. In at least one embodiment, the CMS uploads and at least temporarily stores the content item by associating the content item with the unregistered user or ghost account. Accordingly, in order to share the content item, the CMS can generate a link enabling the later retrieval of the content item that can be sent to the second user. Thus, creation of an unregistered user or ghost account can require no login credentials, thereby providing a simple, user friendly interface for initiating interactions with the CMS.

Further, an unregistered user account can be created with one or more built-in limitations, such as offering the aforementioned sharing services to unregistered users at low volumes or frequencies, which can be tracked based on the unique identifier associated with a respective device. For example, the CMS can set usage thresholds associated with data volumes, send frequency, total number of content items sent, etc. and monitor usage of these accounts with respect to these thresholds. Accordingly, in response to determining a respective usage threshold has been exceeded, a user could be a prompted to register with the CMS or login to an existing account to have the threshold usage limit removed. In one example, in response to receiving a registration request, a user's unregistered user or ghost account could be converted into a registered account. In another example, if the user is an existing user and they login to their user account, the content items associated with the unregistered user or ghost account can be merged with the user's account by, for example, changing the device ID to an account ID and, therefore, associating and storing the content items with the user's account.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7A shows a conventional system bus computing system architecture; and

FIG. 7B shows a computer system having a chipset architecture.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for sharing a content item though a synchronized content management system (CMS) without requiring a user to register or provide login credentials. For example, the CMS can receive a request from a first user of a computing device to share a content item with a second user. Instead of requiring the user to register or provide their login credentials, the CMS can generate an unregistered user account using a unique identifier associated with the computing device. Accordingly, in order to share the content item, the CMS can generate a link enabling the later retrieval of the content item and send the link to the second user. Thus, creation of an unregistered user account can require no login credentials, thereby, providing a simple, user friendly interface for initiating interactions with the CMS.

Various other functions and advantages are described and suggested below as may be provided in accordance with the various embodiments.

Figure 1A:
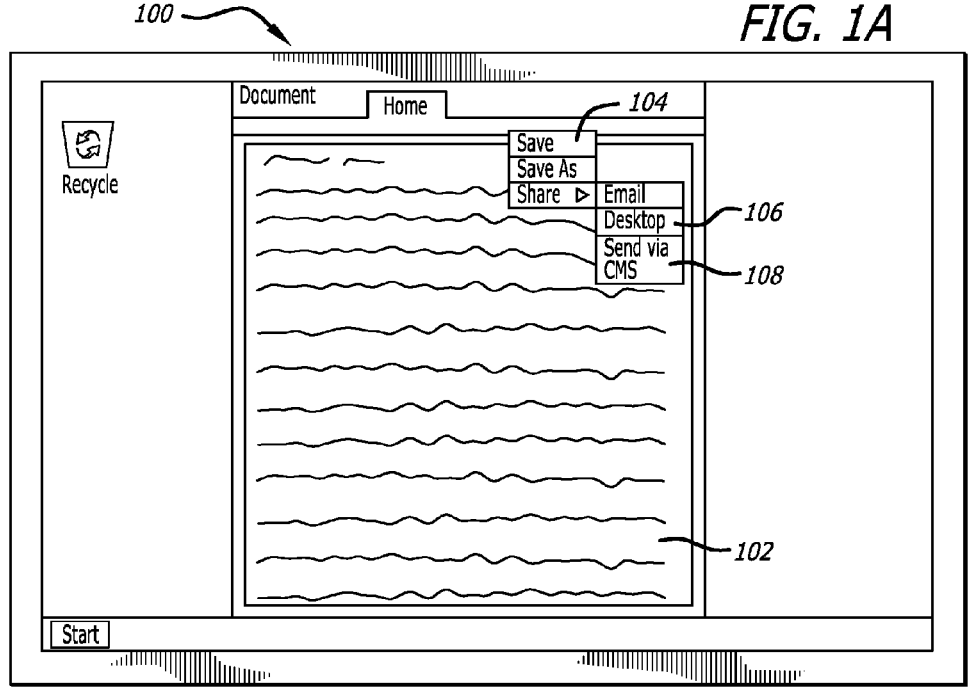
FIG. 1A shows an example screenshot wherein a content management system is selected to share a content item without a user account in accordance with various embodiments.
Figure 1B:
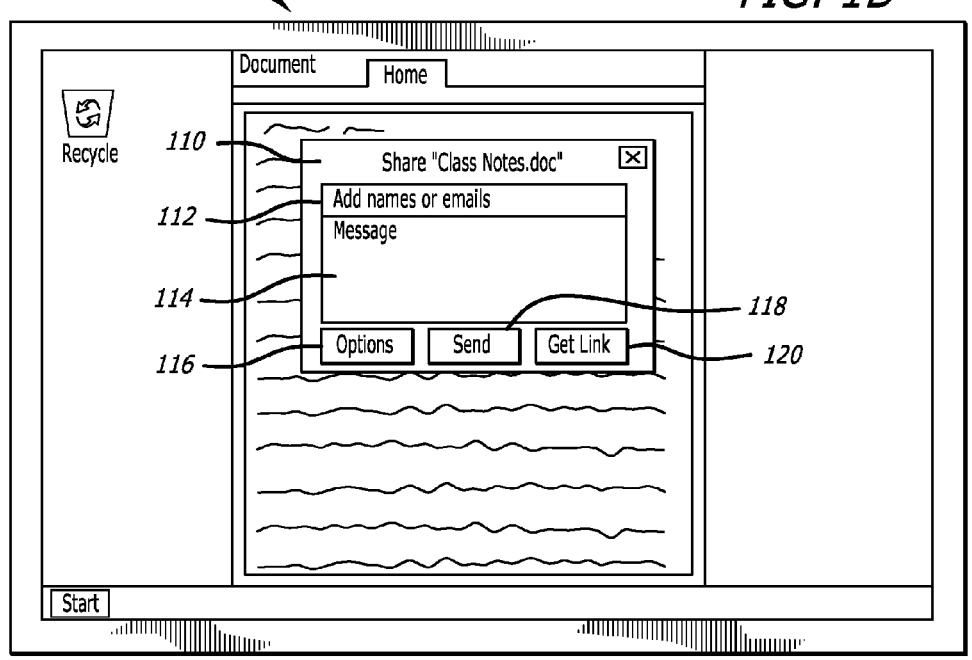
FIG. 1B shows an example screenshot wherein information for a recipient is provided to send the content item in accordance with various embodiments.
Figure 1C:
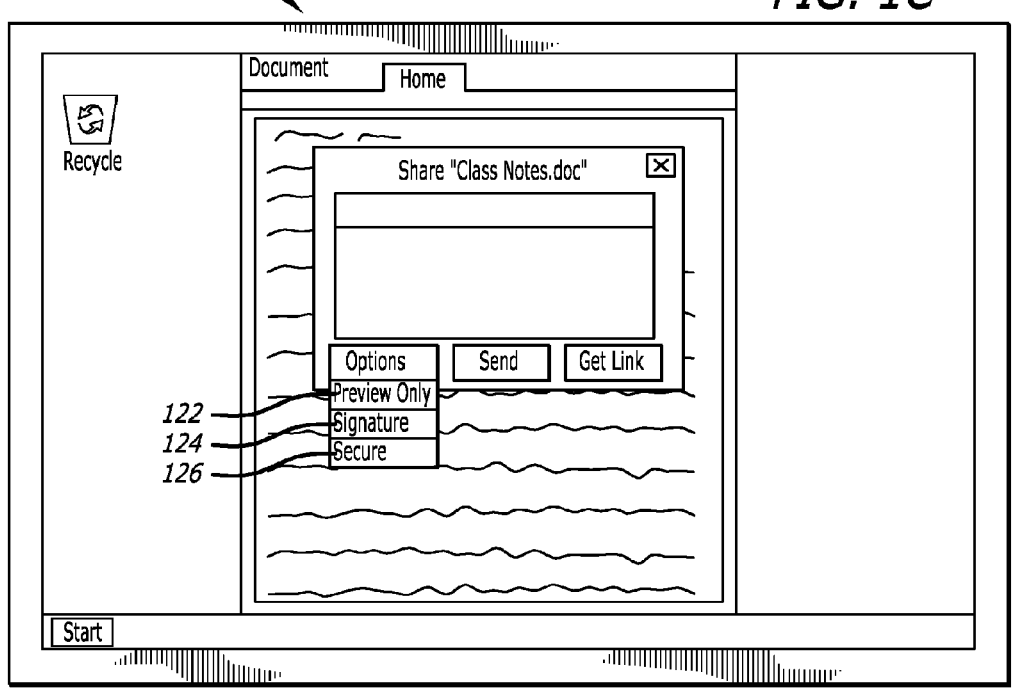
FIG. 1C shows an example screenshot wherein settings associated with the content item are chosen in accordance with various embodiments.

FIGS. 1A-1C show an example process where a content item 102 is shared though a synchronized content management system (CMS) without requiring a user to register or provide login credentials in accordance with various embodiments. For example, a client-side application could have been pre-installed on computing device 100 and the user either does not have a user account with the CMS or is not logged into their user account.

Accordingly, FIG. 1A shows an example screenshot where a client-side application associate with the CMS is integrated with a file system accessible via a word processing program through which content item 102 was created in accordance with at least one embodiment. In other examples, the client-side application can be integrated through a webpage displayed using a web browser application or may include CMS specific components that can be, for example, a stand-alone application, one or more application plug-ins, and/or a browser extension. The user can also interact with the CMS via a third-party application, such as a web browser, that resides on the computing device and is configured to communicate with the CMS.

In this example, the user has opened drop down menu 104, either by right-clicking or selecting a drop down menu associated with saving and sharing content items for the word processing program. The user has, in this example, selected the 'share' option, which has opened second drop-down menu 106 containing options to share content item 102 with, for example, another user. Accordingly, second drop down menu 106 includes 'Send via CMS' option 108, which the user selects as their desired option for sharing content item 102. In this example, the user could have initially opened drop down menu 104 to save and then email content item 102 to a second user, however, upon opening drop down menu 104, learned that they could share content item 102 via the CMS.

FIG. 1B shows an example screenshot where the client-side application can present share user interface (UI) 110 for the user to share content item 102 in accordance with at least one embodiment. In this example, share UI 110 includes recipient field 112 for the user to provide a recipient's information (e.g., email, user name, phone number, etc.), message field 114 in which the user can introduce content item 102 to the recipient, options button 116 to select various content item options, send button 118 to send content item 102, and 'Get Link' button 120 that enables the user to obtain a link to content item 102 from the CMS.

Accordingly, FIG. 1C shows an example screenshot of share user interface (UI) 110 when options button 116 is selected in accordance with at least one embodiment. In this example, options button 116 includes options such as 'Preview Only' option 122 enabling the user to share content item 102 without enabling the recipient to download content item 102, 'Signature' option 124 enabling the user to send content item 102 to the recipient in order to obtain the recipient's signature, and 'Secure' option 126 enabling the user to password protect content item 102 or set a time after which content item 102 is no longer available for the recipient to view. Various other options can also be provided within the scope of various embodiments.

Accordingly, upon the user providing the recipient's information and selecting send button 118, the CMS will receive the user's request. In at least one embodiment, the CMS, upon receiving the request, can determine that computing device 100 is either not associated with or not logged into a user account. Alternatively, the CMS may determine this step at an earlier time, such as when the user initially selects 'Send via CMS' option 108. Accordingly, instead of requiring the user to register or provide their login credentials, the CMS can generate an unregistered user or ghost account using a unique identifier associated with computing device 100. For example, the unique identifier could be a device ID, a phone number if the device is a smartphone, an email address, or any other available identifier which can be used to uniquely and repeatable identify computing device 100.

Figure 2:
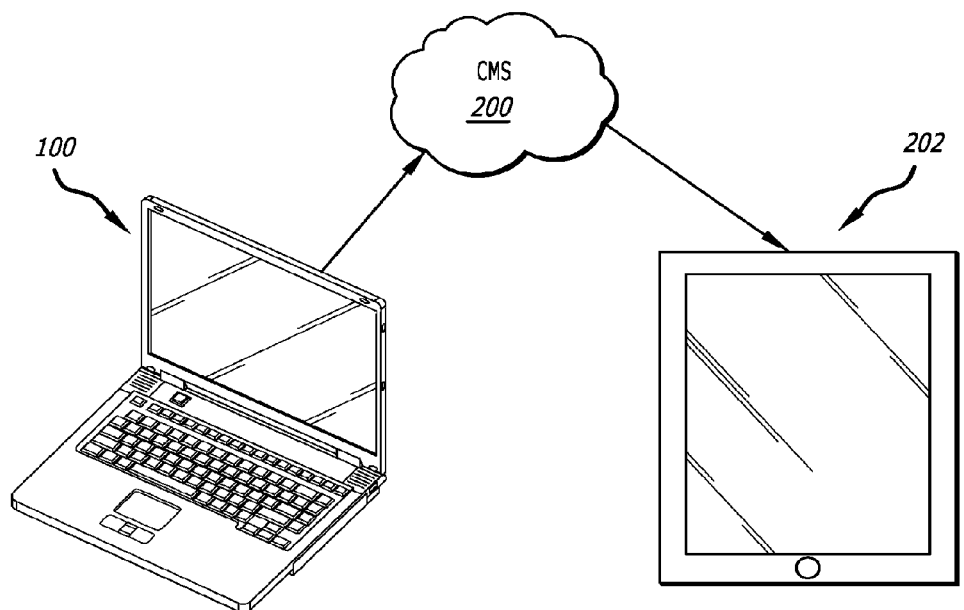
FIG. 2 shows an example environment wherein a first computing device sends the content item to a second computing device though a content management system in accordance with various embodiments.

In at least one embodiment, the CMS uploads and at least temporarily stores content item 102 by associating content item 102 with the unregistered user or ghost account. FIG. 2 shows an environment where computing device 100 sends content item 102 through a network to CMS 200 for at least temporary storage. For example, CMS 200 may store content item 102 for a fixed amount of time from when content item 102 is uploaded. The fixed amount of time could be strictly fixed based on time (unless the user signs into an account or registers with CMS 200) or the fixed amount of time could be reset each time CMS 200 detects or receives some interaction from the user of computing device 100. Thus, even if the user never registers with CMS 200, the user could access their stored content items through an unregistered user account via computing device 100 as long as CMS 200 receives a minimum level of user interaction from computing device 100 to keep the account active.

Accordingly, in order to facilitate the share function, CMS 200 can generate a link to retrieve content item 102 stored in CMS 200 which is then sent to the recipient via email and made viewable on recipient device 202. In order to enable the user to share content item 102 with the recipient and other users, CMS 200 is, in this example, configured to create a sharing link that is a custom network address, such as a uniform resource locator (URL), which allows content item 102 to be accessed without authentication. CMS 200, therefore, can use the sharing link to identify content item 102 and return it to a requesting user device. For example, CMS 200 can include a sharing index that lists each sharing link along with a content path identifying the location of a respective content item associated with a sharing link. CMS 200 can thus use the sharing link received from a requesting client device to search the sharing index and return the content item.

Figure 3:
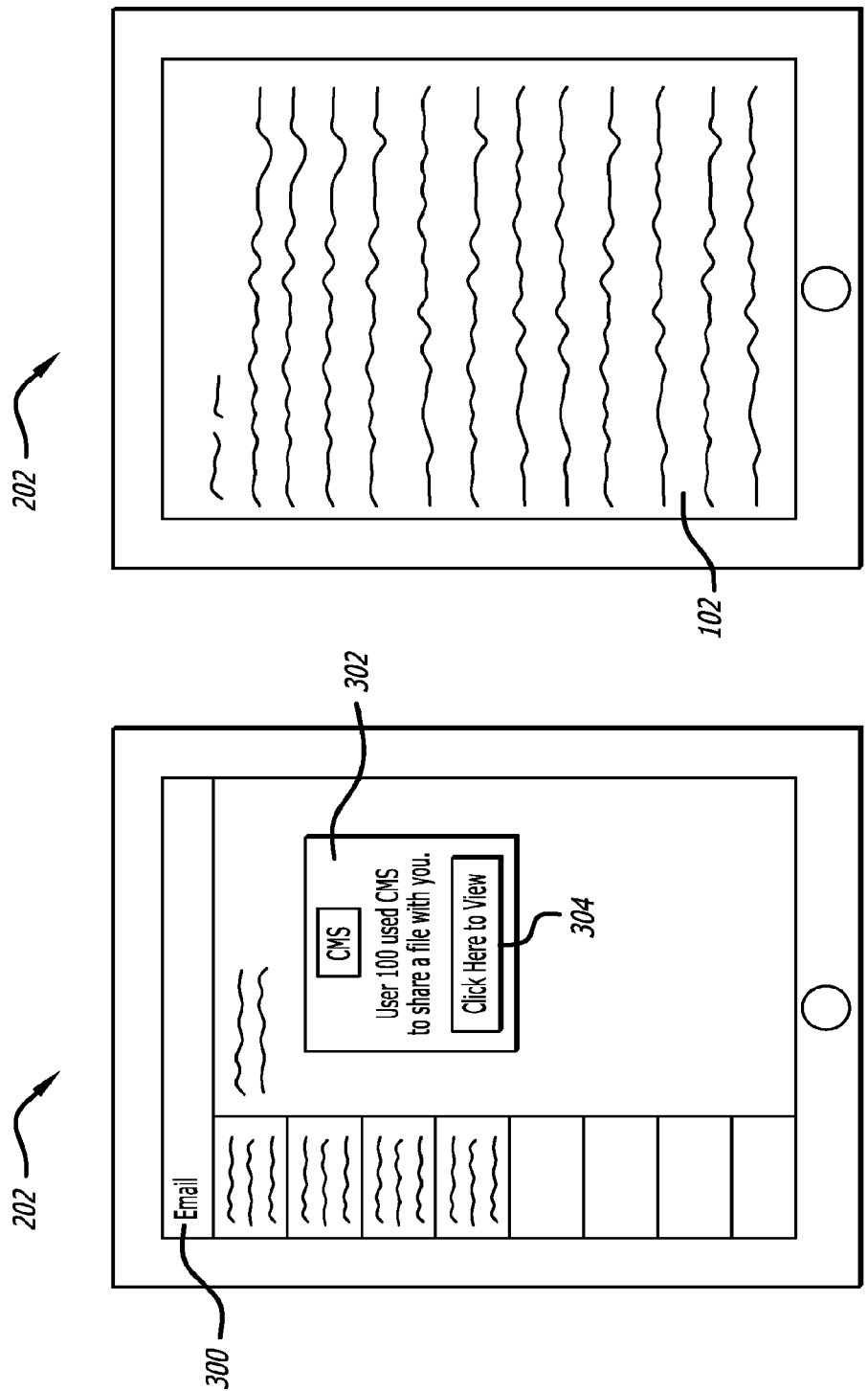
FIG. 3A shows an example screenshot of a recipient computing device wherein the content item is accessible by selecting a link sent via email in accordance with various embodiments.
FIG. 3B shows an example screenshot of the recipient computing device wherein the link has been selected and the content item is displayed in accordance with various embodiments.

Accordingly, FIG. 3A shows an example screenshot of recipient device 202 where content item 102 has been sent via a sharing link in accordance with various embodiments. A sharing link can be provided to a user in multiple ways. In some embodiments, the sharing link can be visually presented to the user. For example the sharing link can be presented as text on the computing device that the user can copy to an email, social networking post, etc., to share the content item. Alternatively, in some embodiments, the sharing link can be stored to a data buffer on a computing device, such as a clipboard. The user can thus access the sharing link by using, for example, a paste function to enter the sharing link into an e-mail, social networking post, etc.

In this example, however, the user of computing device 100 has chosen to send content item 102 via email 300. The user of recipient device 202 has opened an email generated by CMS 200 which contains message 302 stating "User 100 used CMS to share a file with you" and view button 304 that, when selected, enables the user of computing device 202 to download and view content item 102. Accordingly, FIG. 3B shows an example screenshot where view button 304 has been selected and content item 102 is displayed on recipient device 202. Thus, a first user of computing device 100 can send content item 102 via CMS 200 to a second user of recipient device 202 via an unregistered user account with CMS 200 that requires no login credentials.

Further, an unregistered user account can be created with one or more built-in limitations where such sharing services are provided to unregistered users at low volumes or frequencies, which can be tracked based on the unique identifier associated with a respective device. For example, CMS 200 can set usage thresholds associated with data volumes, send frequency, total number of content items sent, etc. and monitor usage of these accounts with respect to these thresholds. Accordingly, in response to determining a respective usage threshold has been exceeded, a user could be a prompted to register with CMS 200 or login to an existing account to have the threshold usage limit removed. In one example, in response to receiving a registration request, a user's unregistered user or ghost account could be converted into a registered account. In another example, if the user is an existing user and they login to their user account, the content items associated with the unregistered user or ghost account can be merged with the user's account by, for example, changing the device ID to an account ID and, therefore, associating and storing the content items with the user's account.

Figure 4:
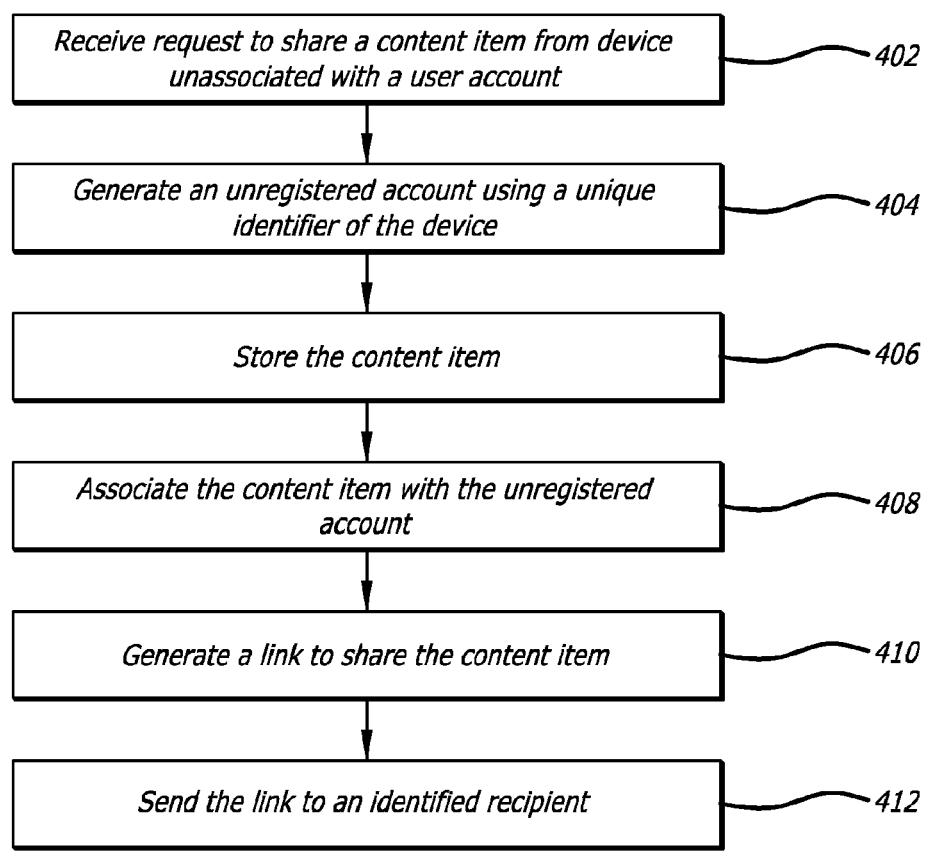
FIG. 4 shows an exemplary process for sharing a content item via a content management system using an unregistered user account in accordance with at least one embodiment.

FIG. 4 shows an exemplary process for sharing a content item via an unregistered user account with a synchronized content management system in accordance with at least one embodiment. It should be understood that, for this and other processes discussed herein, there can be additional, fewer, or alternative steps, performed in similar or alternative orders, or in parallel, within the scope of the various embodiments unless otherwise stated. In this example, a request to share a content item is received from a computing device unassociated with a user account 402. In response to receiving the request, an unregistered user or ghost account can be generated using a unique identifier of the computing device 404. For example, the unique identifier could be a device ID, a phone number if the device is a smartphone, an email address, or any other available identifier which can be used to uniquely and repeatable identify the computing device. In one example, the request could be sent with an indication that the requesting computing device is not at least signed into a user account and, instead of prompting a user who may have an existing account, a synchronized content management system (CMS) can generate the unregistered user or ghost account.

Accordingly, in response to the request, the CMS can upload and at least temporarily store the content item 406. For example, the CMS may store the content item for a fixed amount of time from when content item is uploaded (e.g., 7 days). The fixed amount of time could be strictly fixed based on time (unless the user signs into an account or registers with the CMS) or the fixed amount of time could be reset each time the CMS detects or receives some interaction from a user. Further, uploaded content items may, in some embodiments, be retrievable such that a user could store a respective content item with the CMS, remove it from their computing device and still be able to access a copy. Alternatively, an unregistered user account may only enable a user to share a content item and not retrievable store the content item until the user registers with the CMS or logs into an existing user account. Accordingly, upon being uploaded, the content item is associated with the unregistered account 408. Subsequently, the CMS can generate a link to share the content item 410. Once the link is generated, the link can be sent to an identified recipient by a means determined by the requesting user 412.

Figure 5:
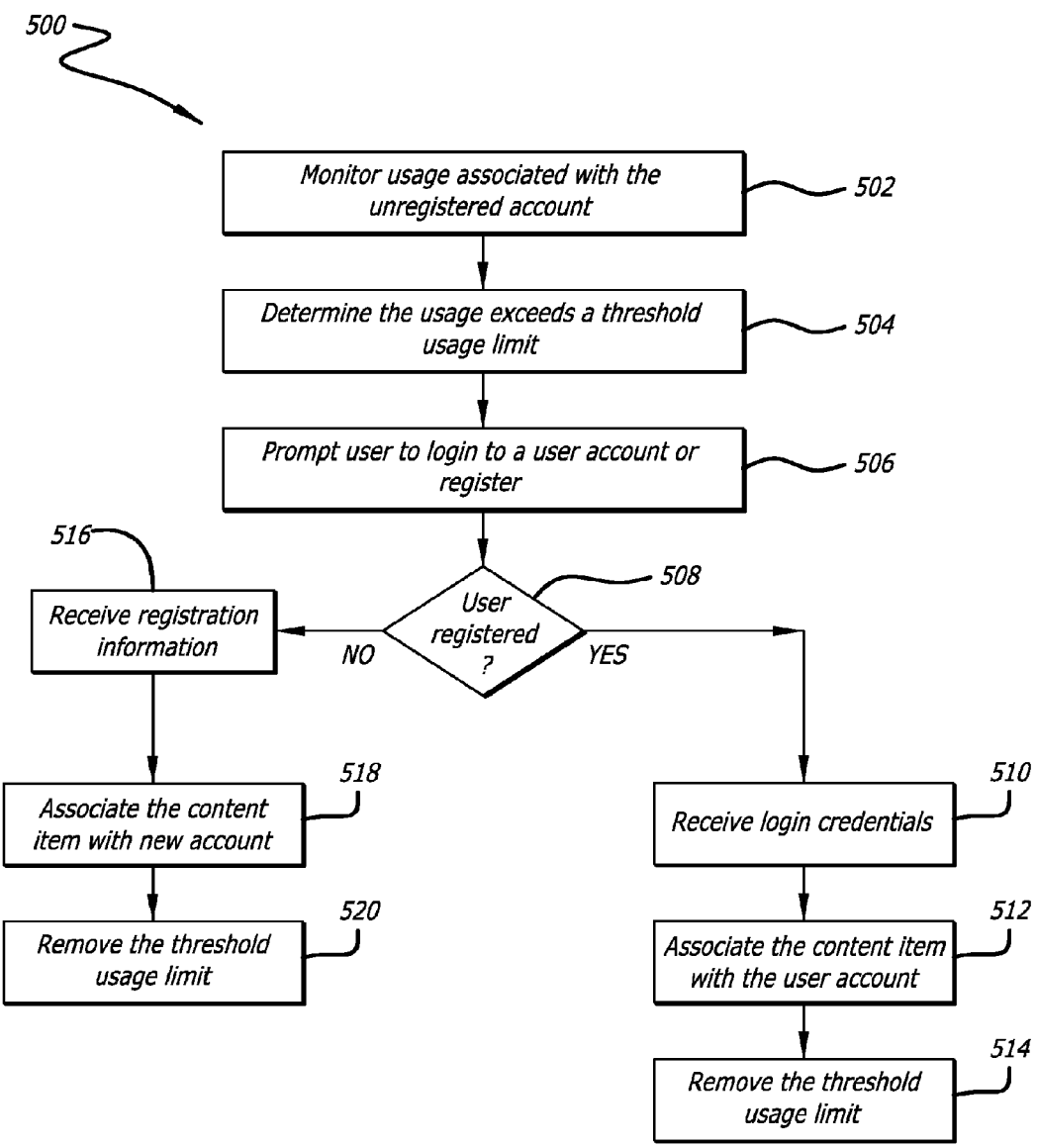
FIG. 5 shows an exemplary process for monitoring usage associated with an unregistered account in accordance with at least one embodiment.

FIG. 5 shows an exemplary process for monitoring usage associated with sharing items via an unregistered account with a synchronized content management system (CMS) in accordance with at least one embodiment. In this example, usage associated with an unregistered account is monitored 502. For example, one or more usage thresholds can be set below which a user is not required to be registered with the CMS. In this example, the monitored usage is determined to exceed a threshold usage limit 504. In response to the threshold being exceeded, a user is prompted to login to a user account or register to establish a user account with the CMS 506.

Accordingly, if the user is registered 508, the CMS can receive the user's login credentials 510. Upon receiving the user's login credentials, the content item is associated with the user's account 512. Since the user has signed into their user account, the threshold limit can be removed 514. If the user is not registered 508, however, the CMS can receive registration information for the user 516. Accordingly, having now registered with the CMS, the content item can be associated with the user's new account 518 and the threshold limit can be removed 520 to enable the user to utilize all features of the CMS.

Further, the CMS can receive a request to associate a second computing device with the user's new account. In response, the CMS can provide a client-side application for installation on the second computing device. Accordingly, the client-side application enables the CMS to communicate with each of the user's computing devices through a respective client-side application to synchronize data associated with content items stored locally on each of the computing devices with data stored in the CMS.

Figure 6:
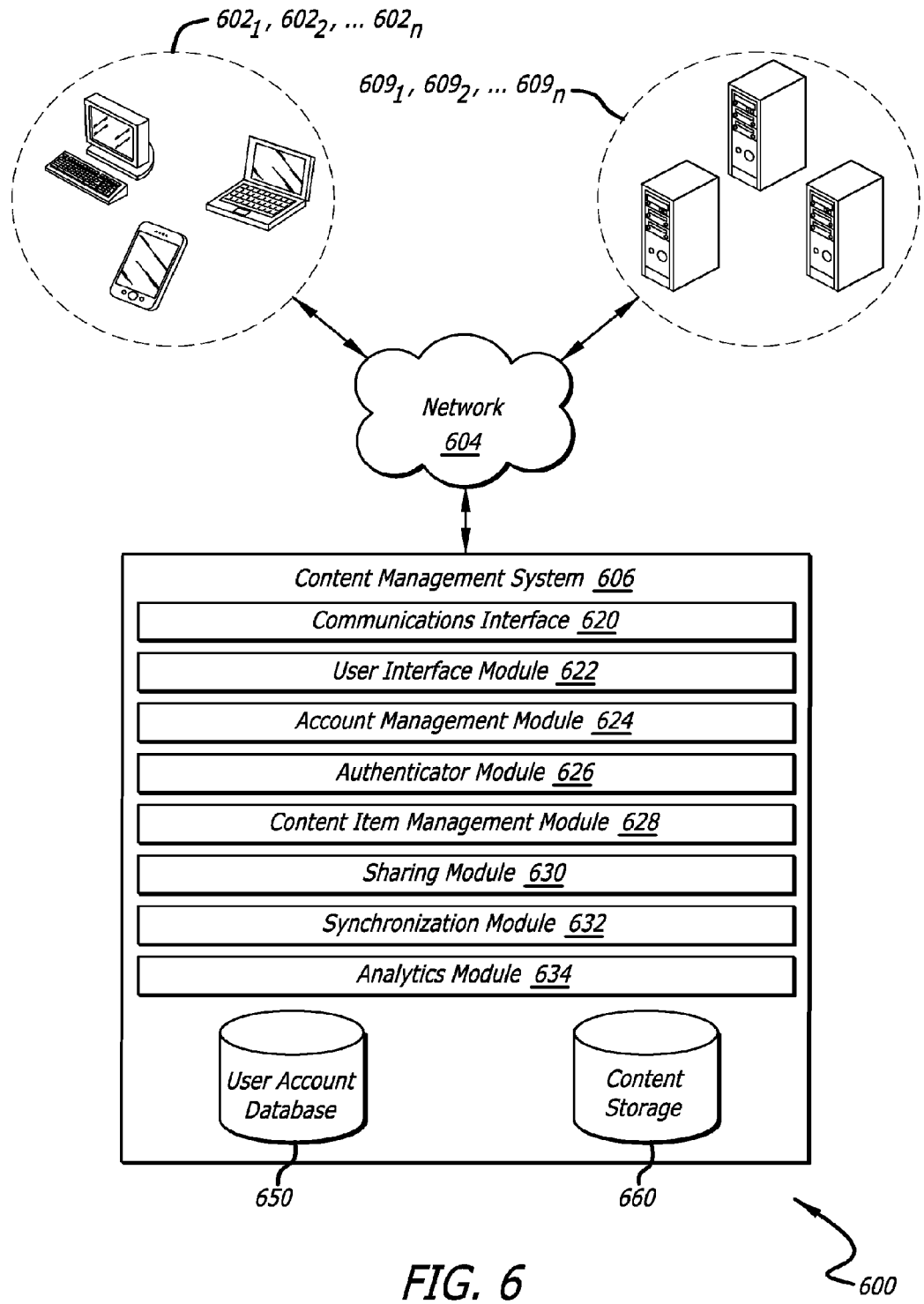
FIG. 6 shows an exemplary configuration of devices and a network in accordance with the invention.

An exemplary system configuration 600 for enabling access to content of a compressed content item from a variety of computing devices is shown in FIG. 6, wherein computing devices communicate via a network for purposes of exchanging content and other data. The system can be configured for use on a wide area network such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, a user can interact with content management system 606 through computing devices $602_1$, $602_2$, ..., $602_n$ (collectively "602") connected to network 604 by direct and/or indirect communication. Content management system 606 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 602 can be of varying type, capabilities, operating systems, etc. Furthermore, content management system 606 can concurrently accept connections from and interact with multiple computing devices 602.

A user can interact with content management system 606 via a client-side application installed on computing device $602_i$. In some embodiments, the client-side application can include a content management system specific component. For example, the component can be a stand-alone application, one or more application plug-ins, and/or a browser extension. However, the user can also interact with content management system 606 via a third-party application, such as a web browser, that resides on computing device $602_i$ and is configured to communicate with content management system 606. In either case, the client-side application can present a user interface (UI) for the user to interact with content management system 606. For example, the user can interact with the content management system 606 via a client-side application integrated with the file system or via a webpage displayed using a web browser application.

Content management system 606 can make it possible for a user to store content, as well as perform a variety of content management tasks, such as retrieve, modify, browse, and/or share the content. Furthermore, content management system 606 can make it possible for a user to access the content from multiple computing devices 602. For example, computing device $602_i$ can upload content to content management system 606 via network 604. The content can later be retrieved from content management system 606 using the same computing device $602_i$ or some other computing device $602_j$.

To facilitate the various content management services, a user can create an account with content management system 606. The account information can be maintained in user account database 650. User account database 650 can store profile information for registered users. In some cases, the only personal information in the user profile can be a username and/or email address. However, content management system 606 can also be configured to accept additional user information.

User account database 650 can also include account management information, such as account type, e.g. free or paid; usage information, e.g. file edit history; maximum storage space authorized; storage space used; content storage locations; security settings; personal configuration settings; content sharing data; etc. Account management module 624 can be configured to update and/or obtain user account details in user account database 650. The account management module 624 can be configured to interact with any number of other modules in content management system 606.

An account can be used to store content, such as digital data, documents, text files, audio files, video files, etc., from one or more computing devices 602 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 660. Content storage 660 can be a storage device, multiple storage devices, or a server. Alternatively, content storage 660 can be a cloud storage provider or network storage accessible via one or more communications networks. Content management system 606 can hide the complexity and details from computing devices 602 so that computing devices 602 do not need to know exactly where the content items are being stored by content management system 606. In one variation, content management system 606 can store the content items in the same folder hierarchy as they appear on computing device $602_i$. However, content management system 606 can store the content items in its own order, arrangement, or hierarchy. Content management system 606 can store the content items in a network accessible storage (SAN) device, in a redundant array of inexpensive disks (RAID), etc. Content storage 660 can store content items using one or more partition types, such as FAT, FAT32, NTFS, EXT2, EXT3, EXT4, ReiserFS, BTRFS, and so forth.

Content storage 660 can also store metadata describing content items, content item types, and the relationship of content items to various accounts, folders, or groups. The metadata for a content item can be stored as part of the content item or can be stored separately. In one variation, each content item stored in content storage 660 can be assigned a system-wide unique identifier.

Content storage 660 can decrease the amount of storage space required by identifying duplicate files or duplicate segments of files. Instead of storing multiple copies, content storage 660 can store a single copy and then use a pointer or other mechanism to link the duplicates to the single copy.

Similarly, content storage 660 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 606 can be configured to support automatic synchronization of content from one or more computing devices 602. The synchronization can be platform agnostic. That is, the content can be synchronized across multiple computing devices 602 of varying type, capabilities, operating systems, etc. For example, computing device $602_i$ can include client software, which synchronizes, via a synchronization module 632 at content management system 606, content in computing device $602_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 606. Conversely, the background process can identify content that has been updated at content management system 606 and synchronize those changes to the local folder. The client software can provide notifications of synchronization operations, and can provide indications of content statuses directly within the content management application. Sometimes computing device $602_i$ may not have a network connection available. In this scenario, the client software can monitor the linked folder for file changes and queue those changes for later synchronization to content management system 606 when a network connection is available. Similarly, a user can manually stop or pause synchronization with content management system 606.

A user can also view or manipulate content via a web interface generated and served by user interface module 622. For example, the user can navigate in a web browser to a web address provided by content management system 606. Changes or updates to content in the content storage 660 made through the web interface, such as uploading a new version of a file, can be propagated back to other computing devices 602 associated with the user's account. For example, multiple computing devices 602, each with their own client software, can be associated with a single account and files in the account can be synchronized between each of the multiple computing devices 602.

Content management system 606 can include a communications interface 620 for interfacing with various computing devices 602, and can interact with other content and/or service providers $609_1$, $609_2$, ..., $609_n$ (collectively "609") via an Application Programming Interface (API). Certain software applications can access content storage 660 via an API on behalf of a user. For example, a software package, such as an app on a smartphone or tablet computing device, can programmatically make calls directly to content management system 606, when a user provides credentials, to read, write, create, delete, share, or otherwise manipulate content. Similarly, the API can allow users to access all or part of content storage 660 through a web site.

Content management system 606 can also include authenticator module 626, which can verify user credentials, security tokens, API calls, specific computing devices, and so forth, to ensure only authorized clients and users can access files. Further, content management system 606 can include analytics module 634 module that can track and report on aggregate file operations, user actions, network usage, total storage space used, as well as other technology, usage, or business metrics. A privacy and/or security policy can prevent unauthorized access to user data stored with content management system 606.

Content management system 606 can include sharing module 630 for managing sharing content publicly or privately. Sharing content publicly can include making the content item accessible from any computing device in network communication with content management system 606. Sharing content privately can include linking a content item in content storage 660 with two or more user accounts so that each user account has access to the content item. The sharing can be performed in a platform agnostic manner. That is, the content can be shared across multiple computing devices 602 of varying type, capabilities, operating systems, etc. The content can also be shared across varying types of user accounts.

In some embodiments, content management system 606 can include a content item management module 628 for maintaining a content directory. The content directory can identify the location of each content item in content storage 660. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 606 can use the content path to present the content items in the appropriate folder hierarchy.

A content entry can also include a content pointer that identifies the location of the content item in content storage 660. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 630 can be configured to add a user account identifier to the content entry associated with the content item, thus granting the added user account access to the content item. Sharing module 630 can also be configured to remove user account identifiers from a content entry to restrict a user account's access to the content item.

To share content publicly, sharing module 630 can be configured to generate a custom network address, such as a uniform resource locator (URL), which allows any web browser to access the content in content management system 606 without any authentication. To accomplish this, sharing module 630 can be configured to include content identification data in the generated URL, which can later be used to properly identify and return the requested content item. For example, sharing module 630 can be configured to include the user account identifier and the content path in the generated URL. Upon selection of the URL, the content identification data included in the URL can be transmitted to content management system 606 which can use the received content identification data to identify the appropriate content entry and return the content item associated with the content entry.

In addition to generating the URL, sharing module 630 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 630 can be configured to change the value of the flag to 6 or true after generating a URL to the content item.

In some embodiments, sharing module 630 can also be configured to deactivate a generated URL. For example, each content entry can also include a URL active flag indicating whether the content should be returned in response to a request from the generated URL. For example, sharing module 630 can be configured to only return a content item requested by a generated link if the URL active flag is set to 6 or true. Thus, access to a content item for which a URL has been generated can be easily restricted by changing the value of the URL active flag. This allows a user to restrict access to the shared content item without having to move the content item or delete the generated URL. Likewise, sharing module 630 can reactivate the URL by again changing the value of the URL active flag to 6 or true. A user can thus easily restore access to the content item without the need to generate a new URL.

While content management system 606 is presented with specific components, it should be understood by one skilled in the art, that the architectural configuration of system 606 is simply one possible configuration and that other configurations with more or less components are also possible.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 750 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   receiving, by a content management system, a request to share a content item with a user, the request being from a computing device unassociated with a user account;
   generating, using a unique device identifier of the computing device, an unregistered user account with the content management system;
   receiving, by the content management system, the content item;
   associating the content item with the unregistered user account;
   generating, by the content management system, a link to share the content item with the user, the link being associated with a path identifying a location of the content item in the content management system, and further associated with the unregistered user account;
   sending the link to the user;
   receiving, by the content management system, a request to retrieve the content item, the request being from the computing device associated with the unregistered user account; and
   denying, by the content management system, access to the content item by the computing device associated with the unregistered user account.

2. The computer-implemented method of claim 1, further comprising:
   monitoring usage associated with the unregistered user account;
   determining the usage exceeds a threshold usage limit; and
   causing a prompt to be displayed on the computing device, the prompt prompting an unregistered user of the computing device to register with the content management system to remove the threshold usage limit.

3. The computer-implemented method of claim 2, wherein the threshold limit is at least one of a data per unit time limit, a cumulative data total limit, a sharable content item size limit, or a total number of content items sharable limit.

4. The computer-implemented method of claim 2, further comprising:
   receiving a registration request from the computing device;
   converting the unregistered user account into a registered account; and
   removing the threshold usage limit.

5. The computer-implemented method of claim 4, further comprising:
   receiving, by the content management system, a second registration request to associate a second computing device with the registered account; and
   causing the second computing device to be associated with the registered account, wherein associating the second computing device with the registered account includes installing a client-side application on the second computing device, and wherein the content management system communicates with the computing device and the second computing device through a respective client-side application to synchronize data stored locally on each of the computing device and the second computing device with data stored in the content management system.

6. The computer-implemented method of claim 1, further comprising:
enabling an unregistered user of the unregistered user account to at least one of password protect the link or set a time period after which the link expires.

7. The computer-implemented method of claim 1, wherein the unique identifier is at least one of a device ID, a phone number, or an email address.

8. The computer-implemented method of claim 1, wherein the content item is received by the content management system from a native client application on the computing device associated with the content management system, wherein the functionality of the native client application is limited when the native client application is associated with the unregistered user account.

9. The computer-implemented method of claim 8, wherein the native client application or a plugin is preinstalled on the computing device.

10. A computing system, comprising:
at least one processor; and
memory including instructions that, when executed by the at least one processor, cause the computing system to:
receive, from a first user of a computing device, a request to share a content item with a second user;
determine that the computing device is not logged into a user account;
generate a ghost account using a unique device identifier of the computing device;
receive and at least temporarily store the content item;
associate the content item with the ghost account;
generate a link to the content item, the link being associated with a path identifying a location of the content item in the system, and further associated with the ghost account;
send the link to the second user;
receive a request to retrieve the content item, the request being from the computing device associated with the ghost account; and
deny access to the content item by the computing device associated with the ghost account.

11. The computing system of claim 10, wherein the instructions that, when executed by the processor, further cause the computing system to:
monitor usage associated with the ghost account;
determine the usage exceeds a threshold usage limit; and
cause a prompt to be displayed on the computing device, the prompt prompting the first user of the computing device to at least one of login to the user account or register with the system.

12. The computing system of claim 11, wherein the instructions that, when executed by the processor, further cause the computing system to:
receive login credentials from the first user;
associated the content item with the user account; and
remove the threshold usage limit.

13. The computing system of claim 11, further comprising:
receive a registration request from the computing device;
convert the ghost account into a registered account; and
remove the threshold usage limit.

14. The computing system of claim 13, wherein the instructions that, when executed by the processor, further cause the computing system to:

receive a second registration request to associate a second computing device with the registered account; and
cause the second computing device to be associated with the registered account, wherein associating the second computing device with the registered account includes installing a client-side application on the second computing device, and wherein the system communicates with the computing device and the second computing device through a respective client-side application to synchronize data stored locally on each of the computing device and the second computing device with data stored in the system.

15. The computing system of claim 10, wherein the computing system communicates with the computing device through at least one of a native client application associated with the system installed on the computing device or a plugin through at least one of a web browser or file system.

16. The computing system of claim 15, wherein at least the native client application or the plugin is preinstalled on the computing device.

17. A non-transitory computer-readable storage medium storing instructions that, when executed by at least one processor, cause a computing device to:
receive, from a first user of a computing device, a request to share a content item with a second user, the first user being unassociated with a user account;
generate a ghost account using a unique device identifier of the computing device;
cause the content item to be associated with the ghost account;
generate a link to the content item, the link being associated with a path identifying a location of the content item, and further associated with the ghost account;
send the link to the second user;
receive a request to retrieve the content item, the request being from the computing device associated with the ghost account; and
deny access to the content item by the computing device associated with the ghost account.

18. The non-transitory computer-readable storage medium of claim 17, wherein the instructions that, when executed by at least one processor, further causes computing device to:
monitor usage associated with the ghost account;
determine that the usage exceeds a threshold usage limit; and
cause a prompt to be displayed on the computing device, the prompt prompting the first user to register a user account to remove the threshold usage limit.

19. The non-transitory computer-readable storage medium of claim 18, wherein the instructions that, when executed by at least one processor, further causes computing device to:
receive a registration request from the computing device;
convert the ghost account into a registered account; and
remove the threshold usage limit.

20. The non-transitory computer-readable storage medium of claim 17, wherein communication with the computing device is provided through at least one of a native client application associated installed on the computing device or a plugin through at least one of a web browser or file system.

21. The non-transitory computer-readable storage medium of claim 20, wherein at least the native client application or the plugin is preinstalled on the computing device.

22. The non-transitory computer-readable storage medium of claim 17, wherein the unique identifier is at least one of a device ID, a phone number, or an email address.

* * * * *